United States Patent [19]

Wada et al.

[11] Patent Number: 4,989,088
[45] Date of Patent: Jan. 29, 1991

[54] ERROR CORRECTION SYSTEM USED IN PICTURE TRANSMISSION

[75] Inventors: Masahiro Wada; Yasuhiro Takishima, both of Saitama, Japan

[73] Assignee: Kokusai Denshin Denwa Co., Ltd., Tokyo, Japan

[21] Appl. No.: 447,479

[22] Filed: Dec. 7, 1989

[30] Foreign Application Priority Data

Dec. 15, 1988 [JP] Japan .................................. 63-314947

[51] Int. Cl.⁵ ........................... H04N 7/12; H04N 7/18
[52] U.S. Cl. ....................................... 358/136; 358/135
[58] Field of Search ........................ 358/135, 136, 105

[56] References Cited

U.S. PATENT DOCUMENTS 4,571,618  2/1986  Hatori et al. ........................ 358/136
4,704,628  11/1987  Chen et al. ......................... 358/136
4,827,339  5/1989  Wada et al. ........................ 358/136

Primary Examiner—John K. Peng
Attorney, Agent, or Firm—Armstrong, Nikaido, Marmelstein, Kubovcik, & Murray

[57] ABSTRACT

In a moving picture transmission in which each picture frame is inter-frame coded for information suppression, and coded data is divided into blocks for transmission, any changes resulting from the loss of transmission blocks in order reproduce a picture on a receiver side is automatically corrected. A receiver side calculates an area in a picture frame affected by the loss of the transmission blocks, conceals the affected picture area by using information from a former picture frame, and affected picture area. A transmitter side, having a propagation table for each encoded picture frame, which shows picture areas affected by a loss of a picture area in a former picture frame, identifies a picture area affected by the lost transmission blocks, repetitively calculates picture areas in succeeding picture frames affected by the picture area in a former picture frame which was affected by the lost transmission block up to the picture frame just before the currently coded picture frame, and encodes the currently coded picture frame without using affected picture areas in the former picture frame. The encoding is for instance intra-frame encoding.

5 Claims, 5 Drawing Sheets

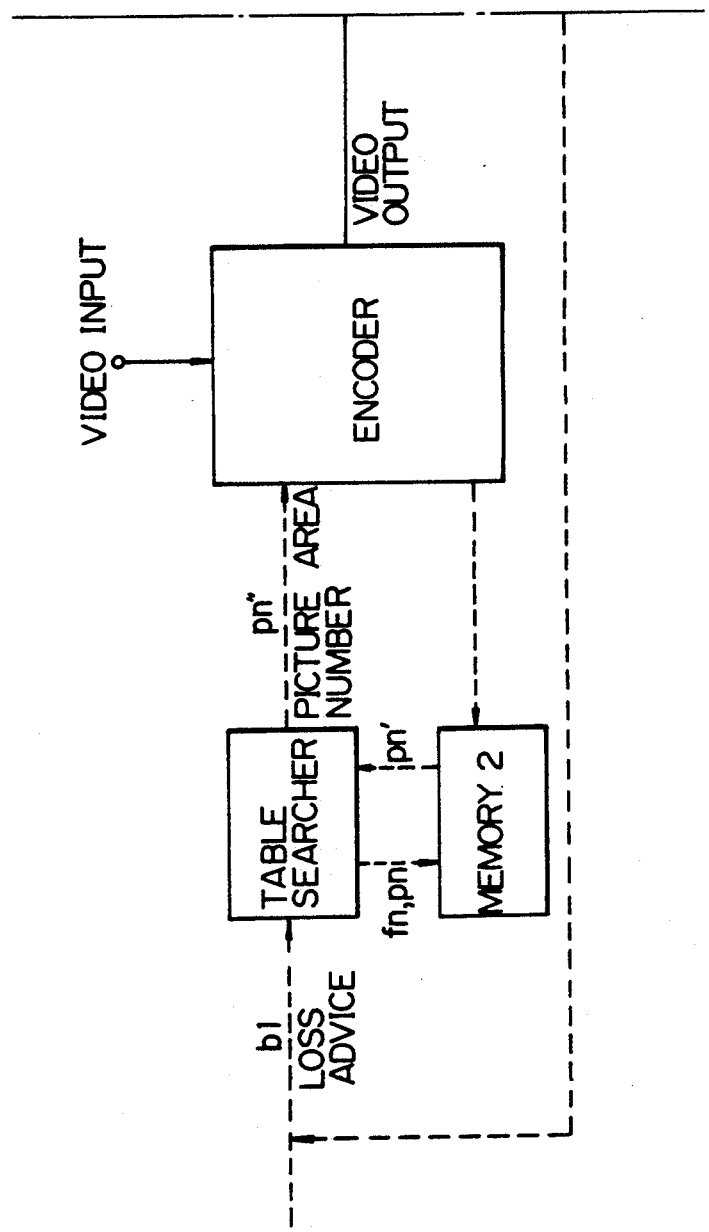

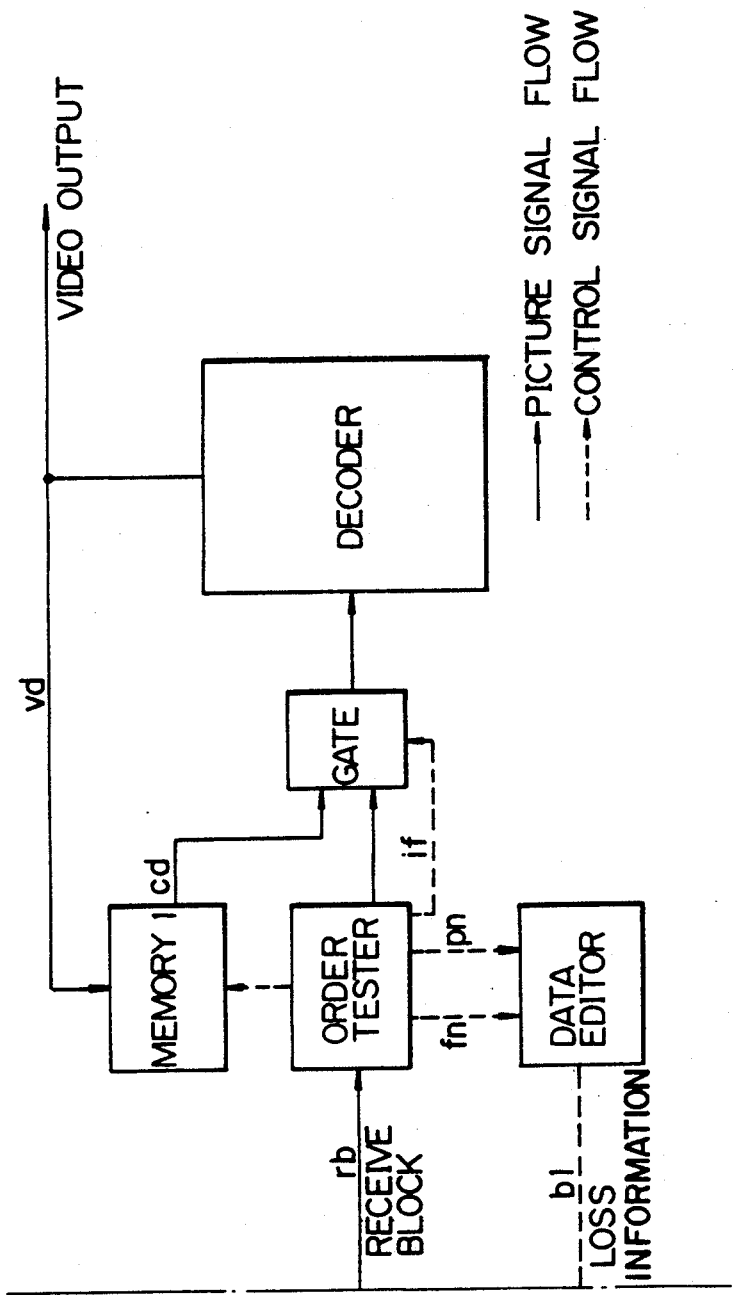

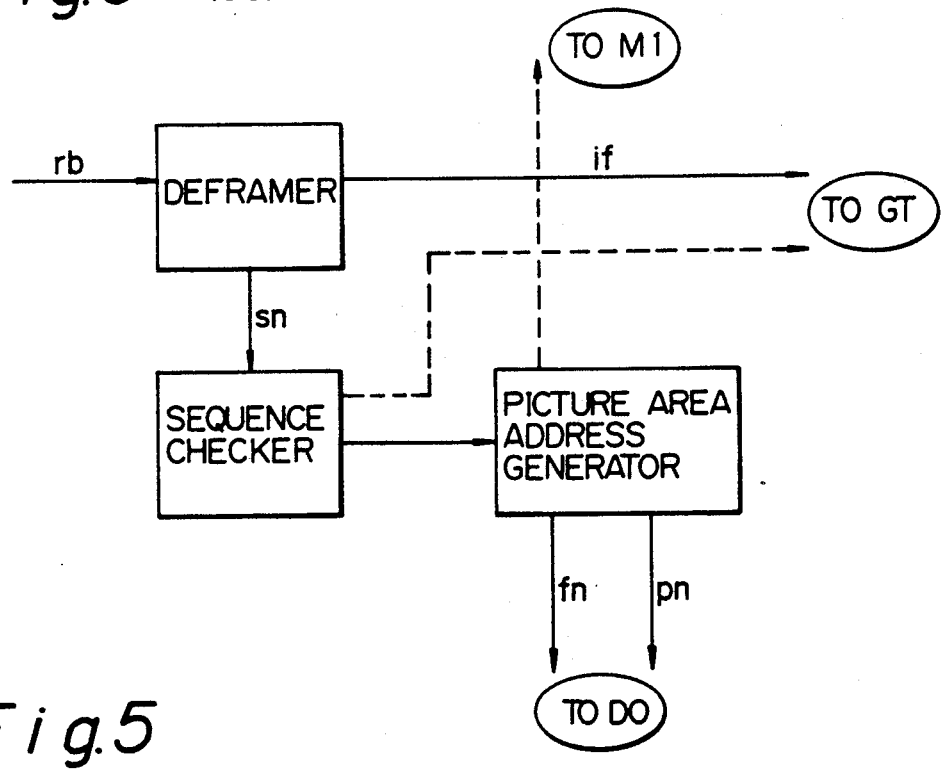
Fig. 3 DETAILED STRUCTURE OF THE ORDER TESTER (OC)
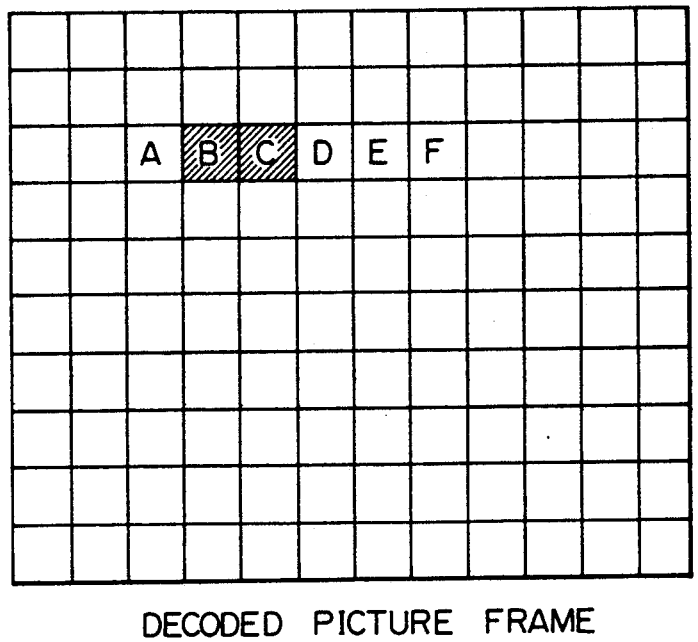
Fig. 5
DECODED PICTURE FRAME

ERROR CORRECTION SYSTEM USED IN PICTURE TRANSMISSION

BACKGROUND OF THE INVENTION

The present invention relates to an error correction system used in a picture transmission which uses an inter-frame coding for information suppression in a video transmission system such as a televideo conference system, and/or a videophone which handles moving pictures.

In a moving picture transmission system using an inter-frame coding for information suppression, a picture signal is divided into blocks each of which has a predetermined code length, or the picture signal is transmitted for each predetermined area portion. The example of the former is shown in Japanese patent application No. 33782/1986, and a conventional asynchronous transfer mode (ATM).

In such a transmission system, a picture area in a received picture frame is sometimes lost due to an error of an address of a transmission block, loss of transmission blocks, and/or traffic overflow in multiplexing transmission modes. When a picture area is lost in an inter-frame coding system, correct decoding becomes impossible unless the lost picture area is compensated.

Conventionally, when a picture area is lost, the succeeding receive data after the lost picture area is disregarded, and the decoding operation stops. Then, the transmitter side switches the coding mode an entire picture frame from the inter-frame coding to the intra-frame coding which uses only the data in the same picture frame. Alternatively, transmission blocks are classified to important blocks which significantly affect decoded pictures, and less important blocks which do not significantly affect decoded pictures.

When a transmission block is lost in the prior art, a decoded moving picture stops for a significant portion of time, and therefore, a decoded moving picture becomes unnatural. Further, the coding efficiency is seriously deteriorated due to intra-frame coding of the entire picture frame.

SUMMARY OF THE INVENTION

It is an object, therefore, of the present invention to overcome the disadvantages and limitations of an error correction system for a moving picture transmission system by providing a new and improved error correction system in a moving picture transmission system.

It is also an object of the present invention to provide an error correction system for a moving picture transmission system which can continue the decoding operation even when a transmission block is lost, having high coding efficiency, and can be combined with all of the encoding systems based on inter-frame coding.

The above and other objects are attained by an error correction system in a picture transmission system in which a moving picture frame is inter-frame coded, and a coded moving picture signal is divided into blocks for transmission comprising; a receiver side having; a device for recognizing a transmission block loss in transmission, a device for calculating a picture area in a picture frame affected by the lost transmission block, and for decoding a picture frame using a provisional compensation data for the picture area which is affected by the lost transmission block, and a device for informing a transmitter side about the picture area affected by the lost transmission block; a transmitter side having; a device for identifying an area in a picture frame which has been transmitted already upon receipt of information about the lost picture area by the receiver side, and for calculating propagation of the affect by the lost picture area to a succeeding picture frame, and a device for coding the succeeding frame without using the effected picture areas.

BRIEF DESCRIPTION OF THE DRAWINGS

The foregoing and other objects, features, and attendant advantages of the present invention will be appreciated as the same become better understood by means of the following description and accompanying drawings wherein;

FIGS. 2, 2-1 and 2-2 are block diagrams of a communication system including a transmitting side and a receiving side according to the present invention, FIG. 3 is a block diagram of an order tester in FIG. 2, FIG. 4A shows an example of transmission block configuration in the present invention, FIG. 4B shows an example of a format of information about the loss of the picture area, and FIG. 5 shows an example of a decoded picture frame consisting of several picture areas carried by transmission blocks.

DESCRIPTION OF THE PREFERRED EMBODIMENTS

Figure 1:
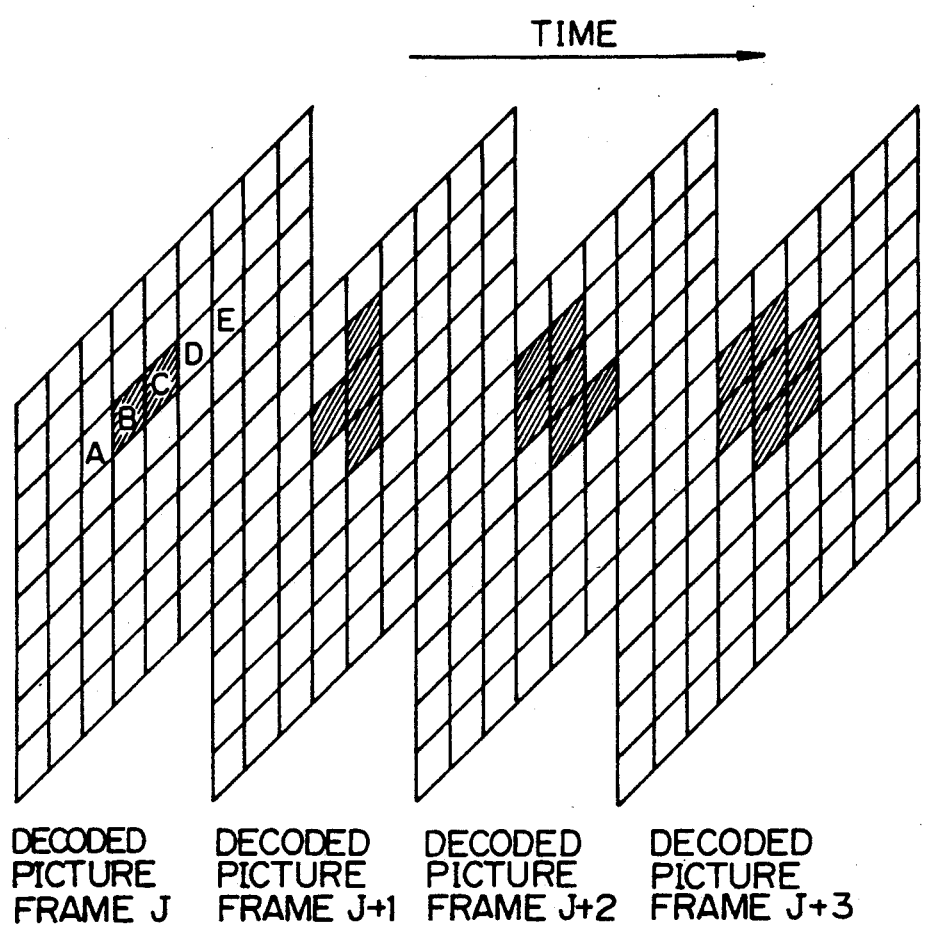
FIG. 1 shows the explanatory drawing of the principle of a propagation of affected picture areas in a transmitter side in the present invention.

The invention is now described in accordance with the figures.

It is assumed that a picture frame is divided into a plurality of picture areas, each of which has a plurality of picture cells as shown in FIG. 5. Each picture area in FIG. 5 has for instance $8 \times 8 (=64)$ picture cells. The information about each picture area is encoded using an information suppression technique, for instance, an inter-frame coding, or intra-frame coding. The coded data is packed into a transmission block of FIG. 4A for transmission. A transmission block may include only one picture area information, or a plurality of picture areas information, depending upon the result of the information suppression.

FIG. 4A shows a transmission block configuration of picture signals which are inter-frame coded, and divided for each transmission block, and each transmission block is transmitted one by one.

It is assumed that a picture frame number is transmitted for each picture frame, and each block has a serial number of blocks ($i-2$, $i-1$, $i$, $i+1$, $i+2$ etc.) for assuring the correct arrival of the all the blocks. The symbols A through F show the identification numbers of picture areas which are included in each transmission block. The symbols A through F in FIG. 5 show also the identification numbers of picture areas, corresponding to the numbers in FIG. 4A.

It is assumed that the transmission block i is lost in transmission. The receiver side recognizes the loss of the transmission block i by checking the serial number of the blocks. Then, the receiver side recognizes through calculation that the lost transmission block i relates to the picture areas B and C in the picture frame j as shown in FIG. 5.

The picture areas B and C in the frame j cannot be reproduced in the receiver side. Therefore, the receiver side inserts the provisional compensation data in the areas B and C. The provisional compensation data is, for instance the picture signals about same areas as those of B and C in the preceeding picture frame.

Simultaneously, the receiver side informs the transmitter side of the loss of the picture areas, together with the identification (j) of the picture frame which suffers from the lost transmission blocks, and the location (B and C) of the lost areas. The receiver side then continues the decoding operation of the picture signals.

FIG. 4B shows a format for the lost picture area information which is forwarded from a receiver side to a transmitter side when a picture block is lost. The format has, as shown in the figure, the signal header and identifier, the information length, the lost picture area address (#1 through #k), and the lost picture area frame number.

The transmitter side starts the correction operation upon receipt of information about the loss of the picture area from the receiver side.

FIG. 1 shows the correction operation on the transmitter side. It is assumed that the picture areas are lost in the decoded picture frame j. The transmitter side identifies the picture areas B and C in the frame j, which have been already transmitted, and also identifies the picture areas which have been inter-frame encoded, using the affected areas, by picture areas B and C, in the succeeding picture frames j+1, j+2, j+3 etc. In other words, the transmitter side calculates the propagation of the affect in the succeeding picture frames of the lost picture areas B and C. FIG. 1 shows that the areas B and C in the picture frame j affects the shadowed areas in the succeeding picture frames j+1, j+2 and j+3.

It is assumed that the transmitter side is encoding the picture frame j+4 when the transmitter side receives the information about the loss of the picture area in the receiver side. In that case, the transmitter side calculates the propagation of the lost picture areas up to the picture frame j+3, and identifies the picture areas in the frame j+3 affected by the lost picture area.

Then, the transmitter side encodes the picture frame j+4 without using the affected picture areas in the picture frame j+3. For instance, the areas in the frame j+4 which originally use the affected areas in the frame j+3 are encoded through intra-frame coding, instead of inter-frame coding.

The transmitter side has a propagation table for each encoded frame for quick calculation of the propagation of errors, as shown in the table below. The length of the propagation table is the same as the number n of the picture areas included in each picture frame, and therefore, the address for accessing the table is from 1 to n, each corresponding to the identification number of the picture area. Assuming that the table is for the picture frame i, the content in the address k ($1 \leq k \leq n$) in the table shows the picture areas in the frame i+1, which have been encoded using the picture area k in the frame i. The content in each address in the propagation table may include a plurality of picture areas, a single picture area, or no picture area.

| Propagation table of picture areas in the transmitter side | |
|---|---|
| Address 1 (Picture area No.) | Picture areas in frame i + 1, encoded using picture area 1 in frame i |
| Address 2 | Picture areas in frame i + 1, encoded using picture area 2 in frame i |
| Address 3 | Picture areas in frame i + 1, encoded using picture area 3 in frame i |
| Address n-1 | Picture areas in frame i + 1, encoded using picture area n-1 in frame i |
| Address n | Picture areas in frame i + 1, encoded using picture area n in frame i |

When picture areas in the picture frame j are lost, the propagation table for the picture frame j is first searched so that the picture areas in the picture frame j+1 which are affected by the lost picture areas in the picture frame j are recognized.

Similarly, the picture areas in the picture frame j+2 affected by the recognized picture areas in the frame j+1 are calculated.

A similar calculation is repeated up to the picture frame which has now been encoded. The next picture frame is encoded without using the affected areas in the previous picture frame.

The present invention can be used in combination with a conventional inter-frame coding system. Therefore, the coding efficiency is high, and even when a transmission error happens, the decoding picture is corrected in a short time and the bit amount of overhead information required for error recovery is small.

FIG. 2 shows a block diagram of a transmitter side and a receiver side according to the present invention, and FIG. 3 shows the detailed structure of the order tester OC in FIG. 2.

An input video signal on a transmitter side is applied to the encoder EC which encodes the video signal and transmits the coded signal in the blocks as shown in FIG. 4A to the receiver side through the transmission line. The decoder DC on the receiver side decodes the received signal, and provides the decoded video output signal.

The received transmission block (rb) is first tested to determine if a transmission block is lost or not by the order tester OC. When there is no transmission block lost, the received transmission block (rb) is deframed and the content data (if) is extracted. The content data (if) is applied to the decoder DC through the gate GT.

When the loss of the transmission block is recognized, the order tester OC calculates the picture areas affected by the loss, and the provisional concealing data (cd) stored in the memory M1 is read out as picture concealment. The provisional concealing data (cd) is input to the decoder DC in place of the affected picture area through the gate GT which is controlled by the order tester OC. The order tester OC also sends the affected picture area number (pn) and the picture frame number (fn) which has the lost picture areas to the transmitter side through the data editor DO as the lost picture area information (b1). The memory M1 which stores the provisional data for picture concealment is always updated by the decoded pictures.

FIG. 3 shows a detailed block diagram of the order tester OC. The received transmission block (rb) is first input to the deframer and the content information, i.e., coded picture signal (if) is extracted. At the same time, the sequence number (sn) attached to the transmission block is applied to the sequence checker and the transmission block loss is examined. When a transmission block loss occurs, this information is applied to the picture area address generator and also to the gate GT.

The picture area address generator generates an address of the picture area which is affected by the loss of the transmission block and the address is input to the memory M1. At the same time, the generated address (pn) and picture frame number (fn) containing the affected picture area are output to the data editor DO.

When the transmitter side receives the lost picture area information (b1), the picture area number (pn) and the picture frame number (fn) from the receiver side are applied to the table searcher TS, which searches the propagation table in the memory M2. The content of the address (pn) for the picture frame (fn) in the memory M2 is read out, and the picture areas (pn') in the next picture frame are obtained. A similar operation is repeated up to the preceeding picture frame of the present encoded frame, and the affected picture areas (pn") in said preceeding picture frame are input to the encoder EC.

The encoder EC continues the encoding operation even when a transmission block is lost, by not using the affected picture areas. The coding system in that case is for instance intra-frame coding which does not use the information of a preceeding frame.

It should be appreciated that the memory M2 is updated for each picture frame encoded.

As described above, the present invention is used in combination with a prior inter-frame coding system, and even when a transmission block is lost, the decoding operation is continued, reproduced pictures in the receiver side never stop, and the correction of a picture is carried out quickly.

The present invention is advantageous in a technical field which transmits moving pictures through an inter-frame coding system for information suppression.

From the foregoing it will now be apparent that a new and improved error correction system for picture transmission has been found. It should be understood of course that the embodiments disclosed are merely illustrative and are not intended to limit the scope of the invention. Reference should be made, therefore, to the appended claims rather than the specification as indicating the scope of the invention.

What is claimed is:

1. An error correction system in a picture transmission system in which a moving picture frame is inter-frame coded, and a coded moving picture signal is divided into transmission blocks for transmission, said error correction system comprising:
   a receiver side having
      a decoder for decoding picture blocks to provide a video output signal,
      means for recognizing a transmission block loss in transmission,
      means for calculating an area in picture frames affected by said lost transmission block,
      means for supplying said decoder with provisional compensation data for an area which is effected by loss of a transmission block, and
      means for information a transmitter side about said picture area affected by the loss of the transmission block;
   a transmitter side having
      an encoder for encoding an input video signal using an information suppression technique,
      means for identifying an affected picture area in a picture frame which has been already transmitting upon receipt of information about the loss of the picture area by said receiver side,
      means for calculating propagation of the affect by said lost picture area to a succeeding picture frame, and
   said encoder coding said succeeding frame without using said affected areas.

2. An error correction system in a picture transmission system according to claim 1, wherein said transmitter side has a propagation table for each coded picture frame indicating the affected picture area on the succeeding frame by indicating a certain picture area in the picture frame.

3. An error correction system in a picture transmission system according to claim 1, wherein each transmission block has a serial number, and loss of the transmission block is recognized on said receiver side by testing said serial number.

4. An error correction system in a picture transmission system according to claim 1, wherein said receiver side has a memory storing a preceeding picture frame for supplying said decoder with said provisional compensation data.

5. An error correction system in a picture transmission system according to claim 4, wherein a gate is provided for switching an input to said decoder between a received transmission block and an output of said memory.

* * * * *